(12) United States Patent
Liang et al.

(10) Patent No.: US 12,308,449 B2
(45) Date of Patent: May 20, 2025

(54) ENERGY STORAGE DEVICE AND ELECTRICAL EQUIPMENT

(71) Applicant: Hithium Tech HK Limited, Kowloon (HK)

(72) Inventors: Jinyun Liang, Fujian (CN); Jingxia Wang, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 0 days.

(21) Appl. No.: 18/384,027

(22) Filed: Oct. 26, 2023

(65) Prior Publication Data

US 2024/0145826 A1     May 2, 2024

Related U.S. Application Data

(63) Continuation of application No. PCT/CN2022/142839, filed on Dec. 28, 2022.

(30) Foreign Application Priority Data

Oct. 28, 2022   (CN) .......................... 202211333975.7

(51) Int. Cl.
*H01M 50/15*        (2021.01)
*H01M 50/143*       (2021.01)

(52) U.S. Cl.
CPC ......... *H01M 50/15* (2021.01); *H01M 50/143* (2021.01); *H01M 2220/20* (2013.01)

(58) Field of Classification Search
CPC . H01M 50/15; H01M 50/143; H01M 2220/20
See application file for complete search history.

(56) References Cited

U.S. PATENT DOCUMENTS

2021/0043912 A1*  2/2021  Zhu ..................... H01M 50/176
2023/0216152 A1*  7/2023  Lee ..................... H01M 50/176
                                                            429/178

FOREIGN PATENT DOCUMENTS

CN       108899441 A      11/2018
CN       208767347 U       4/2019
(Continued)

OTHER PUBLICATIONS

CN113270667A. Aug. 17, 2021. English machine translation by EPO. (Year: 2019).*

(Continued)

*Primary Examiner* — James Lee
(74) *Attorney, Agent, or Firm* — Scully, Scott, Murphy & Presser, P.C.

(57) ABSTRACT

The present application discloses an energy storage device and an electrical equipment. The energy storage device includes: a first lower plastic member, a second lower plastic member, a positive terminal, a negative terminal, a positive connector and a negative connector. The first lower plastic member and the second lower plastic member are provided at intervals. An end of the first lower plastic member facing the second lower plastic member is provided with an explosion-proof net. An end of the second lower plastic member facing the first lower plastic member is provided with a protrusion. The explosion-proof net and the protrusion protrude toward a same side. A first mounting hole is formed on the first lower plastic member, and a second mounting hole is formed on the second lower plastic member.

16 Claims, 3 Drawing Sheets

(56) References Cited

FOREIGN PATENT DOCUMENTS

| | | | |
|---|---|---|---|
| CN | 109860449 | A | 6/2019 |
| CN | 210467901 | U | 5/2020 |
| CN | 212062474 | U | 12/2020 |
| CN | 212934728 | U | 4/2021 |
| CN | 212934729 | U | 4/2021 |
| CN | 213401446 | U | 6/2021 |
| CN | 213716966 | U | 7/2021 |
| CN | 213816379 | U | 7/2021 |
| CN | 113270667 | A | 8/2021 |
| CN | 214589040 | U | 11/2021 |
| CN | 215220845 | U | 12/2021 |
| CN | 216250917 | U | 4/2022 |
| CN | 216354473 | U | 4/2022 |
| CN | 216389540 | U | 4/2022 |
| CN | 114497836 | A | 5/2022 |
| CN | 217239695 | U | 8/2022 |
| CN | 115528378 | A | 12/2022 |
| JP | 2009289611 | A | 12/2009 |
| WO | 2022007481 | A1 | 1/2022 |
| WO | 2022156090 | A1 | 7/2022 |

OTHER PUBLICATIONS

CN109860449A. Jun. 7, 2019. English machine translation by EPO. (Year: 2019).*
CN109860449A English machine translation (Year: 2019).*
CN113270667A English machine translation (Year: 2021).*
International Search Report dated Jul. 14, 2023 issued in PCT/CN2022/142839.
First Office Action dated May 8, 2024 received in Chinese Patent Application No. 202211333975.7.

* cited by examiner

ENERGY STORAGE DEVICE AND ELECTRICAL EQUIPMENT

CROSS-REFERENCE TO RELATED APPLICATIONS

The present application is a continuation of International Application No. PCT/CN2022/142839, filed on Dec. 28, 2022, which claims priority of Chinese patent application No. 202211333975.7, filed on Oct. 28, 2022 and titled "ENERGY STORAGE DEVICE AND ELECTRICAL EQUIPMENT", the entire contents of which are incorporated herein by reference.

TECHNICAL FIELD

The present application relates to the field of energy storage technology, and in particular, to an energy storage device and an electrical equipment.

BACKGROUND

The secondary battery (such as the lithium-ion battery) has the advantages of high energy density, high power density, many number of times of cycling, long storage time, etc. In recent years, the secondary battery has been widely used in the aspects of electric means of transportation such as electric vehicles, electric bicycles, and the large and medium-sized electric equipment such as energy storage facilities.

At present, in the lithium-ion battery, the internal winding core is separated from the top cover through the lower plastic member to prevent the internal cell from contacting with the light aluminum sheet of the top cover, thus causing a short circuit of the cell.

It should be noted that the information disclosed in the above Background section is only used to enhance understanding of the background of the present application, and therefore may include information that does not constitute the prior art known to those skilled in the art.

SUMMARY

The present application adopts the following technical solutions.

According to one aspect of the present application, there is provided an energy storage device, including:
  a first lower plastic member and a second lower plastic member, the first lower plastic member and the second lower plastic member being provided at intervals, an end of the first lower plastic member facing the second lower plastic member being provided with an explosion-proof net, an end of the second lower plastic member facing the first lower plastic member being provided with a protrusion, and the explosion-proof net and the protrusion protruding toward a same side; a first mounting hole being formed on the first lower plastic member, and a second mounting hole being formed on the second lower plastic member;
  a positive terminal and a negative terminal, the positive terminal being assembled on the second mounting hole of the second lower plastic member, and the negative terminal being assembled on the first mounting hole of the first lower plastic member;
  a positive connector and a negative connector, the positive connector being located on a side of the second lower plastic member provided with the protrusion and being connected to the positive terminal; and the negative connector being located on a side of the first lower plastic member provided with the explosion-proof net and being connected to the negative terminal; and
  a positive tab and a negative tab, the positive tab being connected to the positive connector, and the negative tab being connected to the negative connector; and the positive tab being located on a side of the protrusion away from the explosion-proof net, and the negative tab being located on a side of the explosion-proof net away from the protrusion.

According to another aspect of the present application, there is provided an electrical equipment, including the above energy storage device.

It should be understood that the above general description and the following detailed description are only exemplary and explanatory, and do not limit the present application.

BRIEF DESCRIPTION OF THE DRAWINGS

The accompanying drawings, which are incorporated in and constitute a part of this specification, illustrate embodiments consistent with the present application and, together with the specification, serve to explain the principles of the present application. Obviously, the accompanying drawings in the following description are only some embodiments of the present application. For those skilled in the art, other accompanying drawings may be obtained based on these drawings without any creative labor.

EXPLANATION OF REFERENCE SIGNS

Figure 1:
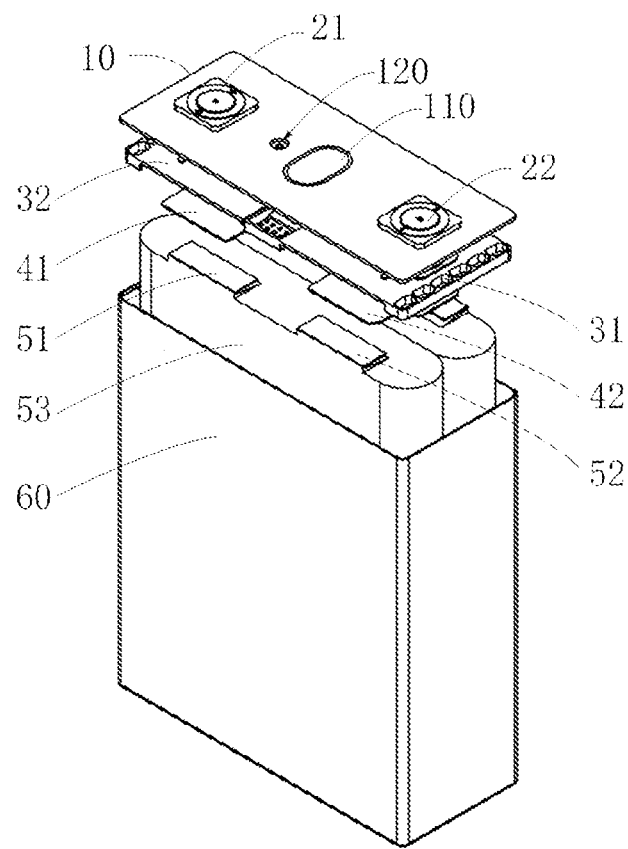
FIG. 1 is an exploded view of an energy storage device provided by an implementation of the present application.

10. Top cover; 110. Explosion-proof valve; 120. Liquid injection hole;
21. Positive terminal; 22. Negative terminal;
31. First lower plastic member; 310. First mounting hole; 311. First lower plastic member body; 312. Explosion-proof net; 313. Second boss; 314. First extension portion; 315. First reinforcing rib; 316. Second reinforcing rib; 317. First boss;
32. Second lower plastic member; 320. Second mounting hole; 321. Second lower plastic member body; 322. Protrusion; 323. Third boss; 324. Second extension portion; 325. Third reinforcing rib; 326. Fourth reinforcing rib;
41. Positive connector; 42. Negative connector;
51. Positive tab; 52. Negative tab; 53. Cell;
60. Housing.

DETAILED DESCRIPTION

Example implementations will now be described more fully with reference to the accompanying drawings. However, the example implementations may be implemented in various forms and should not be construed as being limited to the implementations set forth herein; rather, these implementations are provided so that the present application will be thorough and complete, and will fully convey the concepts of the example implementations to those skilled in the art. The same reference signs in the drawings denote the same or similar structures, and thus their detailed descriptions will be omitted.

The inventor has found that the existing integrated lower plastic member was suitable for the relatively small cells, and the relatively large cells required the use of the lower plastic member with a relatively large area. At this time, due to the large area, the time required for the injection fluid to fill the mold cavity is correspondingly prolonged, and the cooling time of the lower plastic member in individual parts is different, thus the produced lower plastic member is prone to deformation, warping or shrinkage which seriously affects the structural strength of the lower plastic member, which is a major obstacle to the production of the lower plastic member. If it is necessary to prevent these defects from occurring, more raw materials are needed to increase the stability of the structure of the lower plastic member, which increases manufacturing costs and process difficulty.

A main purpose of the present application is to provide an energy storage device that can effectively avoid the situation such as seriously affecting the structural strength due to the deformation, warping or shrinkage of the lower plastic member when an area of the lower plastic member is relatively large, and can prevent a negative tab from being inserted into a gap between a first lower plastic member and a second lower plastic member.

The embodiment of the present application first provides an energy storage device. As shown in FIGS. 1 to 5, the energy storage device includes: a first lower plastic member 31 and a second lower plastic member 32, and a positive terminal 21, a negative terminal 22, a positive connector 41, a negative connector 42, a positive tab 51 and a negative tab 52. An end of the first lower plastic member 31 facing the second lower plastic member 32 is provided with an explosion-proof net 312, and an end of the second lower plastic member 32 facing the first lower plastic member 31 is provided with a protrusion 322. The explosion-proof net 312 and the protrusion 322 protrude toward the same side. A first mounting hole 310 is formed on the first lower plastic member 31, and a second mounting hole 320 is formed on the second lower plastic member 32. The positive terminal 21 is assembled on the second mounting hole 320 of the second lower plastic member 32, and the negative terminal 22 is assembled on the first mounting hole 310 of the first lower plastic member 31. The positive connector 41 is located on a side of the second lower plastic member 32 provided with the protrusion 322, and is connected to the positive terminal 21. The negative connector 42 is located on a side of the first lower plastic member 31 provided with the explosion-proof net 312, and is connected to the negative terminal 22. The positive tab 51 is connected to the positive connector 41, and the negative tab 52 is connected to the negative connector 42. The positive tab 51 is located on a side of the protrusion 322 away from the explosion-proof net 312, and the negative tab 52 is located on a side of the explosion-proof net 312 away from the protrusion 322.

In the energy storage device provided by the present application, the lower plastic member includes a first lower plastic member 31 and a second lower plastic member 32 that are separately provided, which can effectively avoid the situation such as seriously affecting the structural strength due to deformation, warping, or shrinkage of the lower plastic member when an area of the lower plastic member is large. When there is a quality problem in a certain part of the lower plastic member, it is only needed to scrap the corresponding lower plastic member, which reduces material loss, and decreases the manufacturing cost and process difficulty. At the same time, an end of the first lower plastic member 31 facing the second lower plastic member 32 is provided with a protruding explosion-proof net 312. The explosion-proof net 312 is located between the negative connector 42 and the gap. The distance between the negative connector 42 and the gap increases through the explosion-proof net 312, thereby increasing a distance between the negative tab 52 and the gap, thereby preventing the negative tab 52 from being inserted into the gap between the first lower plastic member 31 and the second lower plastic member 32 and abutting against the top cover (a light aluminum plate) 10, so as to prevent the short circuit of the cell 53 and improve the safety of the energy storage device. In addition, an end of the second lower plastic member 32 facing the first lower plastic member 31 is provided with a protrusion 322, and the protrusion 322 is located between the positive connector 41, the positive tab 51 and the gap. The protrusion 322 can limit the positive connector 41 and the positive tab 51 to prevent the positive tab 51 from being inserted into the gap to be folded, bent, or broken, causing problems such as poor conductive contact.

In one embodiment of the present application, as shown in FIG. 1, the energy storage device further includes: a top cover 10, a cell 53 and a housing 60. After the energy storage device is assembled, the cell 53 is accommodated in the housing 60, and the top cover 10, the first lower plastic member 31 and the second lower plastic member 32 cover an opening of the housing 60. The positive tab 51 of the cell 53 is connected to the positive terminal 21 on the top cover 10 through the positive connector 41. The negative tab 52 of the cell 53 is connected to the negative terminal 22 on the top cover 10 through the negative connector 42. In addition, the top cover 10 is also provided with an explosion-proof valve 110 and a liquid injection hole 120. The explosion-proof valve 110 is located above the explosion-proof net 312, and the second lower plastic member 32 is provided with a through hole communicating to the liquid injection hole 120.

Figure 2:
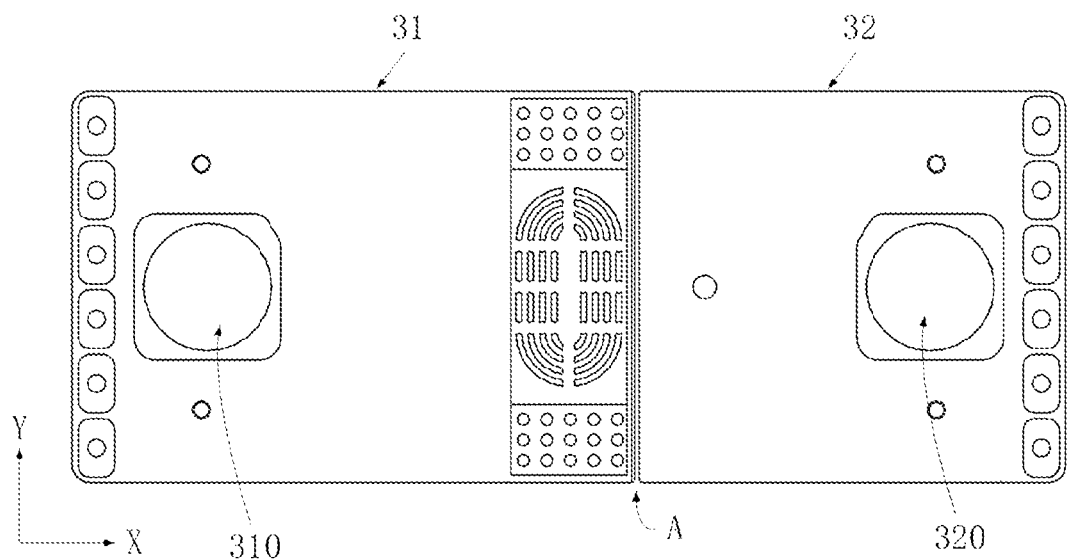
FIG. 2 is a top view of a lower plastic member provided by an implementation of the present application.
Figure 3:
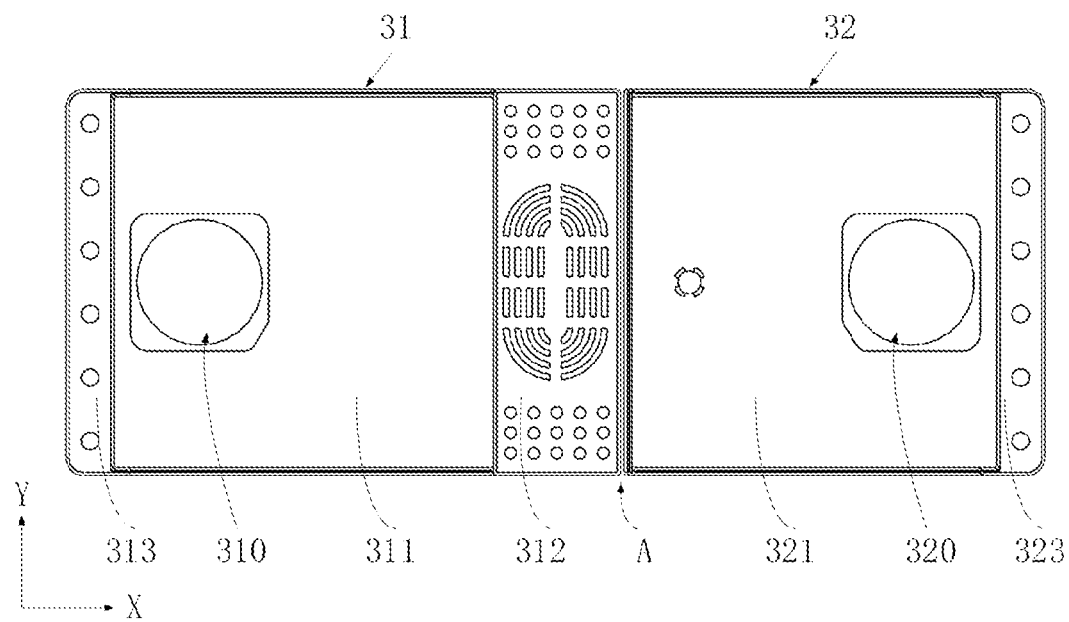
FIG. 3 is a bottom view of the lower plastic member provided by an implementation of the present application.

Specifically, as shown in FIGS. 2 and 3, the first lower plastic member 31 and the second lower plastic member 32 are distributed along a length direction X, and there is a gap A between the first lower plastic member 31 and the second lower plastic member 32. The first lower plastic member 31 and the second lower plastic member 32 are spaced apart along the length direction X. The lower plastic member is divided into two parts with a relatively small length-width ratio, which reduces the difficulty of the manufacturing process of the lower plastic member and the strength requirement for the material. When a quality problem occurs on a certain part on the first lower plastic member 31 and the second lower plastic member 32, only half of the lower plastic member needs to be scrapped, which reduces the material loss. The lower plastic member of the energy storage device may further include a third lower plastic member, a fourth lower plastic member, or more lower plastic members. The multiple lower plastic members may be distributed along the length direction X, or may be distributed along a width direction Y, or may be distributed in both the length direction X and the width direction Y, which is not limited in the present application.

The gap A between the first lower plastic member 31 and the second lower plastic member 32 is a gap between the explosion-proof net 312 and the protrusion 322, that is, the explosion-proof net 312 is located at an end of the first lower plastic member 31 close to the second lower plastic member 32, and the protrusion 322 is located at an end of the second lower plastic member 32 close to the first lower plastic member 31. The explosion-proof net 312 and the protrusion 322 protrude toward the same side, which can further prevent the positive tab 51 from being inserted into the gap to be folded, bent or broken, causing problems such as poor conductive contact.

In the length direction X of the first lower plastic member 31, a width of the protrusion 322 is greater than a width of the gap A. By making the width of the protrusion 322 greater than the width of the gap A, the width of the gap A can be made relatively small, thereby further preventing the positive tab 51 from being inserted into the gap A between the explosion-proof net 312 and the protrusion 322 to be folded, bent or broken, causing poor conductive contact. The width of the protrusion 322 may also be less than or equal to the width of the gap A, which is not limited in the present application.

For example, the gap A between the first lower plastic member 31 and the second lower plastic member 32 is 0.1 mm-10 mm, that is, the gap A between the explosion-proof net 312 and the protrusion 322 is 0.1 mm-10 mm, such as 0.1 mm, 1 mm, 3 mm, 5 mm, 8 mm, 0.1 mm, 10 mm, etc., and the present application will not enumerate here. The width of the gap A is 1.5 mm-5.5 mm to prevent the positive tab 51 from being inserted into the gap A between the explosion-proof net 312 and the protrusion 322 to be folded, bent or broken, causing poor conductive contact. The gap A may also be less than 0.1 mm or greater than 10 mm, which is not limited in the present application.

Specifically, in a width direction Y of the second lower plastic member 32, a limiting surface is formed on a side of the protrusion 322 away from the first lower plastic member 31, and the limiting surface is configured to form a limit for the positive connector 41 to be assembled on the second lower plastic member. By forming the limit for the positive connector 41 to be assembled on the second lower plastic member 32 through the limiting surface, misalignment is avoided when the positive connector 41 is mounted on the second lower plastic member 32.

In a thickness direction Z of the lower plastic member 10, a height of the explosion-proof net 312 is greater than a height of the protrusion 322. By making the height of the explosion-proof net 312 greater than the height of the protrusion 322, a distance between the explosion-proof net 312 and the subsequently provided explosion-proof valve 110 can be increased, which facilitates gas storage and smoothness of gas rushing out of the explosion-proof valve 110 after the explosion-proof net 312 is integrally fused. At the same time, by making the height of the protrusion 322 less than that of the explosion-proof net 312, it is ensured that gas on a side of the protrusion 322 away from the explosion-proof net 312 can flow and be discharged toward the explosion-proof net 312. If the height of the protrusion 322 is greater than that of the explosion-proof net 312, the protrusion 322 may abut against an end face of the cell 53 during use after assembly, which prevents the gas on the side of the protrusion 322 from gathering toward the explosion-proof net 312, so that the gas cannot be discharged through the explosion-proof net 312 in time, which increases the safety hazard of the energy storage device.

Figure 5:
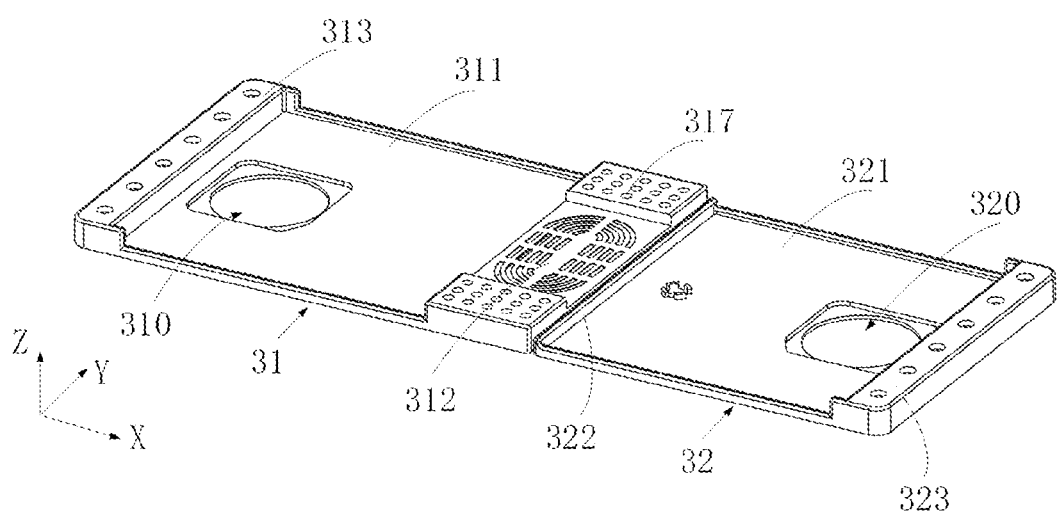
FIG. 5 is an axial view of a lower plastic provided by another implementation of the present application.

In one embodiment of the present disclosure, as shown in FIG. 5, in the width direction Y of the first lower plastic member 31, the explosion-proof net 312 includes first bosses 317 respectively formed on both sides, and a plurality of deflector holes are formed on the first boss 317. In a thickness direction Z of the first lower plastic member 31, a height of the first boss 317 is greater than a height of the explosion-proof net 312. By making the height of the first boss 317 greater than the height of the explosion-proof net 312, keep-space is achieved underneath the explosion-proof net 312 to avoid blocking a vent hole of the explosion-proof net 312 provided on the first lower plastic member 31. When the air pressure inside the cell rapidly increases, timely venting can be ensured, which greatly improves the safety of the energy storage device.

For example, in a thickness direction Z of the second lower plastic member 32, the height of the protrusion 322 is 60% to 90% of the height of the explosion-proof net 312, such as 60%, 70%, 80%, 90%, etc., which is not enumerated in the present application. By making the height of the protrusion 322 be 60% to 90% of the height of the explosion-proof net 312, the height of the protrusion 322 can be slightly less than that of the explosion-proof net 312. On the one hand, it is ensured that gas on a side of the protrusion 322 away from the explosion-proof net 312 can flow and be discharged toward the explosion-proof net 312. On the other hand, it is ensured that the protrusion 322 has a sufficiently high limiting surface to improve the limiting effect on the positive connector 41 to be assembled on the second lower plastic member 32. The height of the protrusion 322 may also be less than 60% or greater than 90% of the height of the explosion-proof net 312, which is not limited in the present application.

For example, in the thickness direction Z of the second lower plastic member 32, the height of the protrusion 322 is 0.1 mm~10 mm, such as 0.1 mm, 1 mm, 3 mm, 5 mm, 8 mm, 0.1 mm, 10 mm, etc., which is not enumerated in the present application. The height of the protrusion 322 is 1.5 mm~5.5 mm, ensuring that the protrusion 322 has a sufficiently high limiting surface to improve the limiting effect on the positive connector 41 to be assembled on the second lower plastic member 32, and simultaneously to prevent the positive tab 51 from being inserted into the gap between the explosion-proof net 312 and the protrusion 322 to be folded, bent, or broken. The height of the protrusion 322 may also be less than 0.1 mm or greater than 10 mm, which is not limited in the present application.

Figure 4:
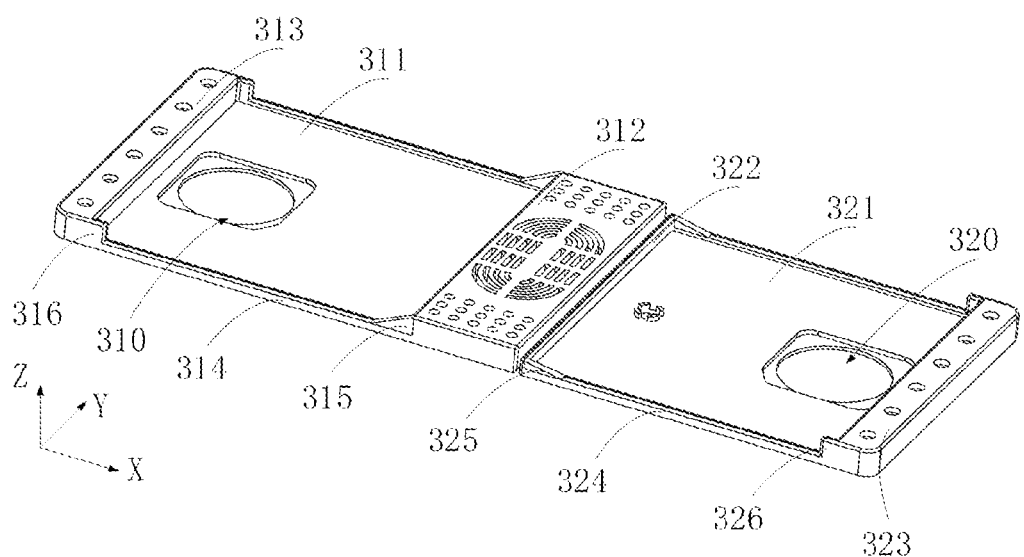
FIG. 4 is an axial view of the lower plastic member provided by an implementation of the present application.

Specifically, as shown in FIG. 4, the first lower plastic member 31 includes a first lower plastic member body 311 and the explosion-proof net 312. In the width direction Y of the first lower plastic member 31, at least one end of the explosion-proof net 312 is formed with a first reinforcing rib 315 connecting the explosion-proof net 312 and the first lower plastic member body 311. By forming the first reinforcing rib 315 connecting the explosion-proof net 312 and the first lower plastic member body 311 at at least one end of the explosion-proof net 312, the structural strength of the first lower plastic member 31 can be improved, and a hot-melt area of a maylar protective film can be increased. When the first bosses 317 are provided on both sides of the explosion-proof net 312, the first reinforcing ribs 315 are respectively formed on the side edges of the two first bosses 317 near the periphery, and the first reinforcing rib 315 connects the first boss 317 and the first lower plastic member body 311.

As shown in FIG. 4, the first lower plastic member 31 further includes a first extension portion 314. The first extension portion 314 is located on both sides of the first lower plastic member body 311 in the width direction Y, and protrudes along the thickness direction Z of the first lower plastic member 31. The first extension portion 314 and the explosion-proof net 312 protrude toward the same side of the first lower plastic member 31. The protruding first extension portion 314 is equivalent to forming a skirt border of the first lower plastic member 31, and the skirt border may serve as a reinforcing rib of the first lower plastic member 31, which improves the structural strength of the first lower plastic member 31. The first reinforcing ribs 315 connecting the explosion-proof net 312 and the first extension portion 314 are formed on both ends of the explosion-proof net 312, which further improves the structural strength of the first lower plastic member 31 and increases the hot-melt area of the maylar protective film.

As shown in FIG. 4, the first lower plastic member 31 further includes a second boss 313. The second boss 313 and the explosion-proof net 312 are respectively located on two ends of the first lower plastic member body 311, and the second boss 313 and the explosion-proof net 312 protrude toward the same side of the first lower plastic member 31. In the width direction Y of the first lower plastic member 31, at least one end of the second boss 313 is formed with a second reinforcing rib 316 connecting the second boss 313 and the first lower plastic member body 311. By forming the second reinforcing rib 316 connecting the second boss 313 and the first lower plastic member body 311 on at least one end of the second boss 313, the structural strength of the first lower plastic member 31 can be improved and the hot-melt area of the maylar protective film can be increased.

As shown in FIG. 4, the first reinforcing ribs 315 connecting the second boss 313 and the first extension portion 314 are formed on both ends of the second boss 313, which further improves the structural strength of the first lower plastic member 31 and increases the hot-melt area of the maylar protective film.

As shown in FIG. 4, the first reinforcing rib 315 on the first lower plastic member 31 may be in the shape of a sheet-like triangle, and the second reinforcing rib 316 may be in the shape of a sheet-like rectangle. The first reinforcing rib 315 and the second reinforcing rib 316 may be an integrally formed structure. The first reinforcing rib 315 may also be in the shape of a rectangle, trapezium, sector, or the like, and the second reinforcing rib 316 may also be in the shape of a triangle, trapezium, sector, or the like, which is not limited in the present application.

Specifically, as shown in FIG. 4, the second lower plastic member 32 includes a second lower plastic member body 321 and the protrusion 322. In the width direction Y of the second lower plastic member 32, at least one end of the protrusion 322 is formed with a third reinforcing rib 325 connecting the protrusion 322 and the second lower plastic member body 321. By forming the third reinforcing rib 325 connecting the protrusion 322 and the second lower plastic member body 321 on at least one end of the protrusion 322, the structural strength of the second lower plastic member 32 can be improved, and the hot-melt area of the maylar protective film can be increased.

As shown in FIG. 4, the second lower plastic member 32 further includes a second extension portion 324. The second extension portion 324 is located on both sides of the second lower plastic member body 321 in the width direction Y, and protrudes along the thickness direction Z of the second lower plastic member 32. The second extension portion 324 and the protrusion 322 protrude toward the same side of the second lower plastic member 32. The protruding second extension portion 324 is equivalent to forming a skirt border of the second lower plastic member 32, and the skirt border may serve as a reinforcing rib of the second lower plastic member 32, which improves the structural strength of the second lower plastic member 32. The third reinforcing ribs 325 connecting the protrusion 322 and the second extension portion 324 are formed on both ends of the protrusion 322, which further improves the structural strength of the second lower plastic member 32 and increases the hot-melt area of the maylar protective film.

As shown in FIG. 4, the second lower plastic member 32 further includes a third boss 323. The third boss 323 and the protrusion 322 are respectively located on two ends of the second lower plastic member body 321, and the third boss 323 and the protrusion 322 protrude toward the same side of the second lower plastic member 32. In the width direction Y of the second lower plastic member 32, at least one end of the third boss 323 is formed with a fourth reinforcing rib 326 connecting the third boss 323 and the second lower plastic member body 321. By forming the fourth reinforcing rib 326 connecting the third boss 323 and the second lower plastic member body 321 on at least one end of the third boss 323, the structural strength of the second lower plastic member 32 can be improved and the hot-melt area of the maylar protective film can be increased.

By providing the first boss 317 and the second boss 313 on the first lower plastic member 31, and providing the third boss 323 on the second lower plastic member 32, the position of the cell 53 therebelow can be limited through the first boss 317, the second boss 313 and the third boss 323, to prevent the cell 53 from scurrying when it is vibrated. In addition, by side walls of the first boss 317, the second boss 313 and the third boss 323 being hot-melt fixed with the maylar protective film, it can be ensured that the entire cell is covered by the maylar protective film, thereby improving the insulation effect.

As shown in FIG. 4, both ends of the third boss 323 are formed with a fourth reinforcing rib 326 connecting the third boss 323 and the second extension portion 324, further improving the structural strength of the second lower plastic member 32 and increasing the hot-melt area of the maylar protective film.

As shown in FIG. 4, the third reinforcing rib 325 on the second lower plastic member 32 may be in the shape of a sheet-like triangle, and the fourth reinforcing rib 326 may be in the shape of a sheet-like rectangle. The third reinforcing rib 325 and the fourth reinforcing rib 326 may be an integrally formed structure. The third reinforcing rib 325 may also be in the shape of a rectangle, trapezium, sector, or the like, and the fourth reinforcing rib 326 may also be in the shape of a triangle, trapezium, sector, or the like, which is not limited in the present application.

In the thickness direction Z of the second lower plastic member 32, a height of the protrusion 322 is greater than a height of the second extension portion 324. By making the height of the protrusion 322 greater than the height of the second extension portion 324, it is ensured that the protrusion 322 with a relatively large height can prevent the positive tab 51 from being inserted into the gap between the explosion-proof net 312 and the protrusion 322 and abutting against the top cover. The height of the protrusion 322 may also be equal to or less than the height of the second extension part 324, which is not limited in the present application.

The positive connector 41 may be an aluminum connecting piece, and the negative connector 42 may be a copper connecting piece. When the top cover 10 and the housing 60 are both made of aluminum, in order to prevent the top cover 10 and the housing 60 from corrosion, a small amount of conductive material is added to an upper plastic member in the positive terminal assembly to enable a weak electrical connection between the top cover 10, the housing 60 and the positive terminal 21, so that a path from the positive tab 51 to the top cover 10 is relatively short, which improves the problem of short circuit.

The energy storage device provided in the present application may be a single battery, or a battery pack or battery module including multiple single batteries.

According to an implementation of the present application, in a width direction of the second lower plastic member, a limiting surface is formed on a side of the protrusion away from the first lower plastic member, and the limiting surface is configured to form a limit for the positive connector to be assembled on the second lower plastic member.

According to an implementation of the present application, an extension portion protruding along a thickness direction of the second lower plastic member is formed on a side edge of the second lower plastic member in the width direction of the second lower plastic member, and the extension portion and the protrusion protrude toward a same side of the second lower plastic member.

According to an implementation of the present application, a height of the protrusion is greater than a height of the extension portion in the thickness direction of the second lower plastic member.

According to an implementation of the present application, a height of the explosion-proof net is greater than a height of the protrusion in a thickness direction of the second lower plastic member.

According to an implementation of the present application, in a width direction of the first lower plastic member, the first lower plastic member includes first bosses located on both sides of the explosion-proof net, and a plurality of deflector holes are formed on the first boss; and in a thickness direction of the first lower plastic member, a height of the first boss is greater than a height of the explosion-proof net.

According to an implementation of the present application, a height of the protrusion is 60% to 90% of a height of the explosion-proof net in a thickness direction of the second lower plastic member.

According to an implementation of the present application, a height of the protrusion is 0.1 mm~10 mm in the thickness direction of the second lower plastic member.

According to an implementation of the present application, the first lower plastic member includes a first lower plastic member body and the explosion-proof net, and in a width direction of the first lower plastic member, at least one end of the explosion-proof net is formed with a first reinforcing rib connecting the explosion-proof net and the first lower plastic member body.

According to an implementation of the present application, the first lower plastic member includes a first lower plastic member body and a second boss, the second boss and the explosion-proof net are respectively located on two ends of the first lower plastic member body, and the second boss and the explosion-proof net protrude toward a same side of the first lower plastic member; and in a width direction of the first lower plastic member, at least one end of the second boss is formed with a second reinforcing rib connecting the second boss and the first lower plastic member body.

According to an implementation of the present application, the second lower plastic member includes a second lower plastic member body and the protrusion, and in a width direction of the second lower plastic member, at least one end of the protrusion is formed with a third reinforcing rib connecting the protrusion and the second lower plastic member body.

According to an implementation of the present application, the first lower plastic member includes a second lower plastic member body and a third boss, the third boss and the protrusion are respectively located on two ends of the second lower plastic member body, and the third boss and the protrusion protrude toward a same side of the second lower plastic member; and in a width direction of the second lower plastic member, at least one end of the third boss is formed with a fourth reinforcing rib connecting the third boss and the second lower plastic member body.

According to an implementation of the present application, a gap between the first lower plastic member and the second lower plastic member is a gap between the explosion-proof net and the protrusion.

According to an implementation of the present application, the gap is 0.1 mm~10 mm.

An embodiment of the present application further provides an electrical equipment, which includes the energy storage device described in the above embodiments. The electrical equipment may be a vehicle, for example. In the electrical equipment provided by the present application, the lower plastic member of the energy storage device includes a first lower plastic member and a second lower plastic member that are separately provided, which can effectively avoid the situation such as seriously affecting the structural strength due to deformation, warping, or shrinkage of the lower plastic member when an area of the lower plastic member is large. When there is a quality problem in a certain part of the lower plastic member, it is only needed to scrap the corresponding lower plastic member, which reduces material loss, decreases the manufacturing cost and process difficulty. At the same time, an end of the first lower plastic member facing the second lower plastic member is provided with a protruding explosion-proof net, and the explosion-proof net is located between the negative connector and the gap. The explosion-proof net increases a distance between the negative connector and the gap, thereby increasing a distance between the negative tab and the gap, thereby preventing the negative tab from being inserted into the gap between the first lower plastic member and the second lower plastic member and abutting against the top cover, so as to prevent short circuit of the cell and improve the safety of the energy storage device. In addition, an end of the second lower plastic member facing the first lower plastic member is provided with a protrusion, and the protrusion is located between the positive connector, the positive tab and the gap. The protrusion can limit the positive connector and the positive tab to prevent the positive tab from being inserted into the gap to be folded, bent or broken, causing problems such as poor conductive contact, which improves the safety of the electrical equipment.

In the embodiments of the present application, the term "a plurality of" or "multiple" refers to two or more than two, unless otherwise explicitly limited. The terms "mounting", "communication", "connection" and "fixing" should be understood in a broad sense. For example, the term "connection" may be a fixed connection, a detachable connection, or an integral connection. The term "communication" may be communicated either directly or indirectly through an intermediary. For those skilled in the art, the specific meanings of the above terms in the embodiments of the present application may be understood according to specific circumstances.

In the description of the embodiments of the present application, it should be understood that the orientation or positional relationship indicated by the terms "upper", "lower" and the like is based on the orientation or positional relationship shown in the accompanying drawings, and is only for the convenience of describing the embodiments of the present application and simplification of description, but does not indicate or imply that the device or unit referred to must have a specific direction, be constructed and operated in a specific orientation, and therefore cannot be construed as a limitation on the embodiments of the application.

In the description of the present specification, the term "one embodiment" means that a specific feature, structure, material or characteristic described in combination with the embodiment or example is included in at least one embodiment or example of the embodiments of the application. In the present description, schematic representations of the above terms do not necessarily refer to the same embodiment or example. Furthermore, the specific features, structures, materials or characteristics described may be combined in any suitable manner in any one or more embodiments or examples.

The above are only some embodiments of the present application, and are not intended to limit the embodiments of the present application. For those skilled in the art, the embodiments of the present application may have various modifications and changes. Any modifications, equivalent substitutions, improvements, and the like made within the spirit and principles of the embodiments of the present application should be included in the protection scope of the embodiments of the present application.

What is claimed is:

1. An energy storage device, comprising:
a first lower plastic member and a second lower plastic member, the first lower plastic member and the second lower plastic member being provided at intervals, an end of the first lower plastic member facing the second lower plastic member being provided with an explosion-proof net, an end of the second lower plastic member facing the first lower plastic member being provided with a protrusion, and the explosion-proof net and the protrusion protruding toward a same side; a first mounting hole being formed on the first lower plastic member, and a second mounting hole being formed on the second lower plastic member; wherein a height of the explosion-proof net is greater than a height of the protrusion in a thickness direction of the lower plastic member;
a positive terminal and a negative terminal, the positive terminal being assembled on the second mounting hole of the second lower plastic member, and the negative terminal being assembled on the first mounting hole of the first lower plastic member;
a positive connector and a negative connector, the positive connector being located on a side of the second lower plastic member provided with the protrusion and being connected to the positive terminal; and the negative connector being located on a side of the first lower plastic member provided with the explosion-proof net and being connected to the negative terminal; and
a positive tab and a negative tab, the positive tab being connected to the positive connector, and the negative tab being connected to the negative connector; and the positive tab being located on a side of the protrusion away from the explosion-proof net, and the negative tab being located on a side of the explosion-proof net away from the protrusion,
wherein an extension portion protruding along a thickness direction of the second lower plastic member is formed on a side edge of the second lower plastic member in the width direction of the second lower plastic member, and the extension portion and the protrusion protrude toward a same side of the second lower plastic member, and
wherein a height of the protrusion is greater than a height of the extension portion in the thickness direction of the second lower plastic member.

2. The energy storage device according to claim 1, wherein in a width direction of the second lower plastic member, a limiting surface is formed on a side of the protrusion away from the first lower plastic member, and the limiting surface is configured to form a limit for the positive connector to be assembled on the second lower plastic member.

3. The energy storage device according to claim 1, wherein in a width direction of the first lower plastic member, the first lower plastic member comprises first bosses located on both sides of the explosion-proof net, and a plurality of deflector holes are formed on the first boss; and in a thickness direction of the first lower plastic member, a height of the first boss is greater than a height of the explosion-proof net.

4. The energy storage device according to claim 1, wherein a height of the protrusion is 60% to 90% of a height of the explosion-proof net in a thickness direction of the second lower plastic member.

5. The energy storage device according to claim 4, wherein the height of the protrusion is 0.1 mm~10 mm in the thickness direction of the second lower plastic member.

6. The energy storage device according to claim 1, wherein the first lower plastic member comprises a first lower plastic member body and the explosion-proof net, and in a width direction of the first lower plastic member, at least one end of the explosion-proof net is formed with a first reinforcing rib connecting the explosion-proof net and the first lower plastic member body.

7. The energy storage device according to claim 1, wherein the first lower plastic member comprises a first lower plastic member body and a second boss, the second boss and the explosion-proof net are respectively located on two ends of the first lower plastic member body, and the second boss and the explosion-proof net protrude toward a same side of the first lower plastic member; and in a width direction of the first lower plastic member, at least one end of the second boss is formed with a second reinforcing rib connecting the second boss and the first lower plastic member body.

8. The energy storage device according to claim 1, wherein the second lower plastic member comprises a second lower plastic member body and the protrusion, and in a width direction of the second lower plastic member, at least one end of the protrusion is formed with a third reinforcing rib connecting the protrusion and the second lower plastic member body.

9. The energy storage device according to claim 1, wherein the first lower plastic member comprises a second lower plastic member body and a third boss, the third boss and the protrusion are respectively located on two ends of the second lower plastic member body, and the third boss and the protrusion protrude toward a same side of the second lower plastic member; and in a width direction of the second lower plastic member, at least one end of the third boss is formed with a fourth reinforcing rib connecting the third boss and the second lower plastic member body.

10. The energy storage device according to claim 1, wherein a gap between the first lower plastic member and the second lower plastic member is a gap between the explosion-proof net and the protrusion.

11. The energy storage device according to claim 10, wherein the gap is 0.1 mm~10 mm.

12. An electrical equipment, comprising an energy storage device according to claim 1.

13. The electrical equipment according to claim 12, wherein in a width direction of the second lower plastic member, a limiting surface is formed on a side of the protrusion away from the first lower plastic member, and the limiting surface is configured to form a limit for the positive connector to be assembled on the second lower plastic member.

14. The electrical equipment according to claim 12, wherein in a width direction of the first lower plastic member, the first lower plastic member comprises first bosses located on both sides of the explosion-proof net, and a plurality of deflector holes are formed on the first boss; and in a thickness direction of the first lower plastic member, a height of the first boss is greater than a height of the explosion-proof net.

15. The electrical equipment according to claim 12, wherein a height of the protrusion is 60% to 90% of a height of the explosion-proof net in a thickness direction of the second lower plastic member.

16. The electrical equipment according to claim 15, wherein the height of the protrusion is 0.1 mm~10 mm in the thickness direction of the second lower plastic member.

* * * * *